United States Patent Office 3,646,025
Patented Feb. 29, 1972

---

3,646,025
7-[α-(1,3-SUBSTITUTED AMIDINO-2-THIO)ACETA-MIDO]CEPHALOSPORANIC ACIDS
Leonard Bruce Crast, Jr., Clay, N.Y., assignor to
Bristol-Myers Company, New York, N.Y.
No Drawing. Filed Oct. 30, 1969, Ser. No. 872,769
Int. Cl. C07d *99/24*
U.S. Cl. 260—243 C
46 Claims

ABSTRACT OF THE DISCLOSURE

Certain 7 - [α - (1,3 - substituted - amidino - 2 - thio) acetamido]-cephalosporanic acids and derivatives thereof were prepared and found to be potent antibacterial agents, e.g., the reaction of 7-(α-bromoacetamido)cephalosporanic acid with 1,3-diethylthiourea produced 7-[α-(1,3-diethylamidino-2-thio)acetamido]cephalosporanic acid.

BACKGROUND OF THE INVENTION

(1) Field of the invention

This invention relates to chemical compounds useful as antibacterial agents in the treatment of infectious diseases caused by gram-positive and gram-negative bacteria in mammals, and particularly in man. There exists a need to provide alternative and improved agents for the treatment of infections caused by bacteria, and for the decontamination of objects bearing such organisms, e.g., hospital equipment, etc.

(2) Description of the prior art

Cephalothin and cephaloridine are well-known antibacterial agents. The literature also contains considerable data on the activity of cephaloglycin and cephalexin. The literature on cephalosporins has been reviewed by E.P. Abraham, Quart. Rev. (London), 21, 231 (1967), by E. Van Heyningen, Advan. Drug Res., 4, 1070 (1967) and briefly by L. C. Cheney, Annual Reports in Medicinal Chemistry, 1967, Academic Press Inc., 111 Fifth Ave., New York 10003, on pages 96 and 97.

There are many patents and references describing the reaction of 7-aminocephalosporanic acid and/or 7-substituted-amino-cephalosporanic acid and derivatives thereof with nucleophilic agents in particular thioureas, substituted thioureas, 2-mercaptopyrimidines and the like to produce 3-methylthiouronium derivatives, 7-pyrimidinylthio-substituted cephalosporins, 7-aminocephalosporanic acid, etc.

(1) U.S. Pat. No. 3,278,531, Oct. 11, 1966 (Brit. Pat. No. 1,012,913) describes the treatment of the compound having the formula

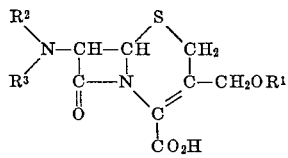

in which $R^1$ is an acyl group and $R^2$ and $R^3$ are each hydrogen atoms or $R^2$ is a hydrogen atom and $R^3$ is an acyl group; with different nucleophiles, the most pertinent of which are:

(A) thiourea and substituted thioureas including aliphatic, aromatic, alicyclic and heterocyclic thioureas and
(B) thiols and substituted thiols, particularly aminothiols and substituted aminothiols; to produce compounds having the formula

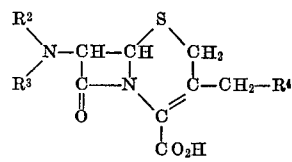

wherein $R^2$ and $R^3$ are as above and $R^4$ corresponds to the nucleophile employed.

(2) U.S. Pat. No. 3,422,100 Jan. 14, 1969 describes the preparation of the compound having the formula

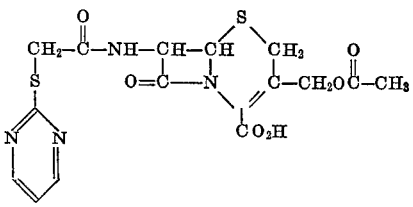

by the treatment of 7-[α-bromoacetamido]cephalosporanic acid with 2-mercaptopyrimidine.

(3) U.S. Pat. No. 3,261,832, July 19, 1966, also describes certain 3-methylthiouronium compounds.

(4) Additional information of the reaction of thioureas with sodium 7-[α-chloroacetamido]cephalosporanic acid is found in "Cephalosporanic Acids," Part II, J. Chem. Soc., pp. 5015–31 (9/65). The article teaches that the reaction of thiourea with sodium 7-[α-chloroacetamido] cephalosporanic acid produces 7-aminocephalosporanic acid (7–ACA) and *not* 7-[amidinothioacetamido] cephalosporanic acid. This article also teaches the reaction of thioureas with acylated 7–ACA produces 3-methylthiouronium derivatives.

(5) An article by Nasaki et al., J. Am. Chem. Soc., 90:16, pp. 4508–9 (1968) teaches thiourea is a good reagent for the preparation of amines from α-haloacetamides via hydrolytic fission (analogous to 4 above).

(6) South African Pat. No. 68/8,185, describes the preparation of compounds of the formula

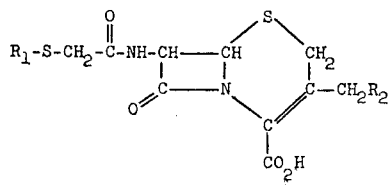

wherein $R_1$ represents a heterocyclic residue containing at least 2 heteroatoms which is linked with the sulfur atoms of the mercapto-acetyl group directly through the carbon atom located between 2 heteroatoms, and where $R_2$ stands for free hydroxyl group, an ester, a quaternary amino group, an N-substituted carbamoyl or an inner salt. The compounds are generally prepared by a method comparable to that employed in the present invention, e.g., condensation of a heterocyclicthiourea with a 7-[α-haloacetamido]cephalosporanic acid or derivatives thereof.

In view of all the above, the compounds of the present invention are both new and novel and are not anticipated nor suggested by the prior art.

SUMMARY OF THE INVENTION

The 7 - [α-(1,3-substituted-amidino-2-thio)-acetamido] cephalosporanic acids and derivatives thereof of the present invention are compounds having the formula

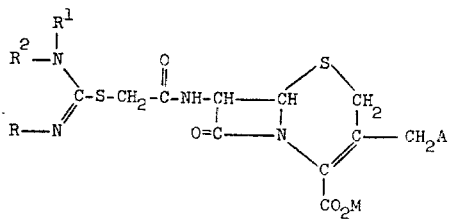

wherein

A is hydrogen, (lower)alkanoyloxy, azido, benzoyloxy or a quaternary ammonium radical;

M is hydrogen, a pharmaceutically acceptable nontoxic cation, or an ionic charge when A is the quaternary ammonium radical;

R, $R^1$ and $R^2$ are each (lower)alkyl, (lower)alkynyl, (lower)alkenyl or (lower)cycloalkyl and $R^2$ may also be, and preferably is, hydrogen; or a nontoxic, pharmaceutically acceptable acid addition salt thereof in which M is hydrogen.

This invention relates to new synthetic compounds of value as antibacterial agents, as nutritional supplements in animal feeds, as agents for the treatment of mastitus in cattle, and as therapeutic agents in poultry and animals, including man, in the treatment of infectious diseases caused by gram-positive and gram-negative bacteria, and more particularly, relates to certain 7-[α-(1,3-disubstituted-amidino-2 - thio)-acetamido]-cephalosporanic acids and 7-[α-(1,1,3-trisubstituted-amidino-2-thio)-acetamido] cephalosporanic acids and the various derivatives thereof as defined by —A in the compound designated I, and salts thereof, and to processes for their preparation.

Antibacterial agents in the past have proven highly effective in the therapy of infections due to either gram-positive or gram-negative bacteria but few are effective against both. It was the objective of the present invention to provide novel compounds effective against both gram-positive and gram-negative bacteria including resistant strains.

It was a further object of the present invention to provide cephalosporins active against gram-positive and gram-negative bacteria which are also efficiently absorbed upon parenteral or oral administration to man and animals.

The objects of the present invention have been achieved by the provision, according to the present invention, of the compounds of the formula

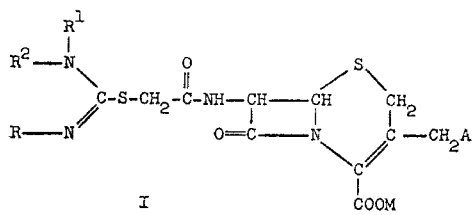

wherein

A is hydrogen, (lower)alkanoyloxy containing 2 to 8 carbon atoms, e.g., acetoxy, propionoyloxy, butanoyloxy, pentanoyloxy, etc., azido, benzoyloxy, or a quaternary ammonium radical, e.g., pyridinium, quinolinium, picolinium, lutidinium; and M is hydrogen, a pharmaceutically acceptable nontoxic cation, or an anionic charge when A is the quaternary ammonium radical; and R, $R^1$ and $R^2$ are each (lower)alkyl, (lower)alkynyl, (lower)alkenyl or (lower)cycloalkyl and $R^2$ may also be hydrogen; or a nontoxic, pharmaceutically acceptable acid addition salt thereof in which M is hydrogen.

The term "(lower)alkyl" as used herein means both straight and branched chain aliphatic hydrocarbon radicals having from 1 to 7 carbon atoms such as methyl, ethyl, propyl, isopropyl, butyl, isobutyl, t-butyl, amyl, hexyl, etc.

When the term "(lower)alkynyl" or "(lower)alkenyl" is used, it is meant to define groups having the formula $$—(CH_2)_n—C{\equiv}C—(CH_2)_m—H$$

$$—(CH_2)_n—CH{=}CH—(CH_2)_m—H$$

respectively wherein $n$ and $m$ are integers of 0 to 5 inclusive, but in which the total number of carbons in the group does not exceed 6. Examples of these functional groups would include allyl ($—CH_2—CH{=}CH_2$), propargyl ($—CH_2—CH{\equiv}CH$), 3-butenyl $$(—CH_2—CH_2—CH{=}CH_2)$$

3-butynyl ($—CH_2—CH_2C{\equiv}CH$), 2-butenyl $$(—CH_2—CH{=}CH—CH_3)$$

2-butynyl ($—CH_2—C{\equiv}C—CH_3$), and the like. Allyl and propargyl are preferred.

Where the term "(lower)cycloalkyl" is used, it refers to a cycloalkyl group containing 3 to 7 carbon atoms such as cyclopropyl, cyclobutyl, cyclopentyl, cyclohexyl or cycloheptyl.

For illustrative purposes, shown below is the formula of the compound when in Formula I, A is acetoxy, M is H and $R^1$, $R^2$ and R are ethyl (II).

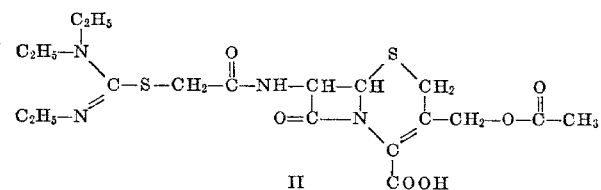

Also for illustrative purposes, shown below are the formulas of the compound when, in Formula I, A is a quaternary ammonium radical (pyridinium), M is an anionic charge, $R^1$ is hydrogen, $R^2$ is cyclopropyl and R is ethyl (III); when A is acetoxy, $R^1$ and R are ethyl and $R^2$ and more hydrogen (IV); when A and M are hydrogen, $R^1$ and R are ethyl and $R^2$ is hydrogen (V); and when A is axido, M is sodium, $R^1$ is methyl, R is isopropyl and $R^2$ is ethyl (VI).

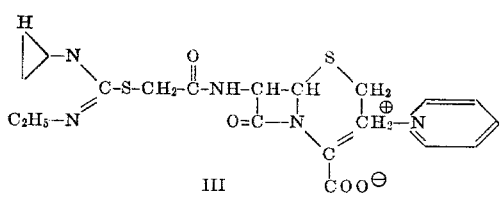

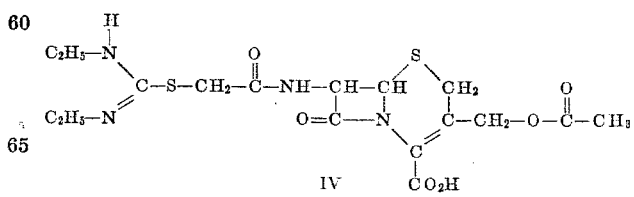

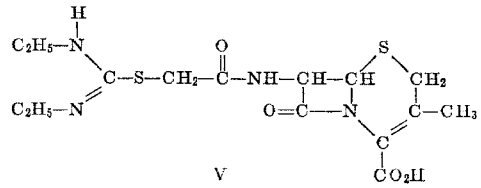

and

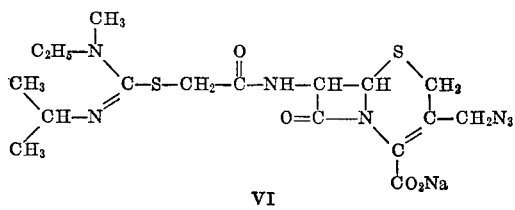

VI

An embodiment of the present invention is the group of compounds having the formula

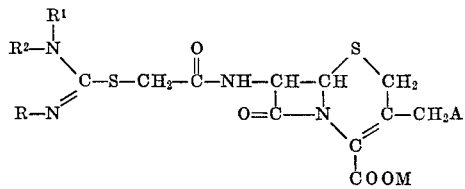

wherein A is hydrogen, (lower)alkanoyloxy, azido, benzoyloxy or a quaternary ammonium radical of the formula

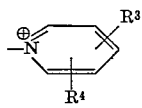

wherein $R^3$ and $R^4$ are each hydrogen or methyl;

M is hydrogen, a pharmaceutically acceptable nontoxic cation, or an anionic charge when A is a quaternary ammonium radical; and R, $R^1$ and $R^2$ are each (lower)alkyl, (lower)alkynyl, (lower)alkenyl or (lower)cycloalkyl and $R^2$ may also be hydrogen; or a nontoxic, pharmaceutically acceptable acid addition salt thereof in which M is hydrogen.

A preferred embodiment is the group of compounds having the formula

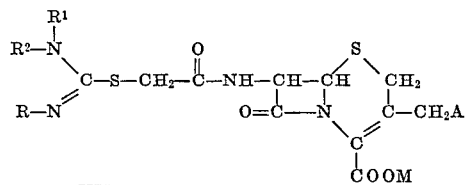

VII wherein A is hydrogen, (lower)alkanoyloxy, azido, benzoyloxy or a quaternary ammonium radical of the formula

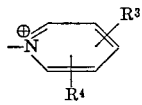

wherein $R^3$ and $R^4$ are each hydrogen or methyl,

M is hydrogen, a pharmaceutically acceptable nontoxic cation or an ionic charge when A is the quaternary ammonium radical; and R, $R^1$, and $R^2$ are each (lower)alkyl, (lower)alkynyl, (lower)alkenyl or (lower)cycloalkyl.

Other preferred embodiments of the present invention are:

(A) The compounds of Formula VII wherein A is hydrogen, acetoxy, azido or pyridinium; and M is hydrogen, a pharmaceuticaly acceptabe nontoxic cation or an anionic charge when A is pyridinium.

(B) The compounds of Formula VII wherein A is hydrogen, acetoxy or azido; and M is hydrogen or a pharmaceutically acceptable nontoxic cation.

(C) The compounds of Formula VII wherein A is acetoxy; and M is hydrogen or a pharmaceutically acceptable nontoxic cation.

(D) The compounds of Formula VII wherein A is azido; and M is hydrogen or a pharmaceutically acceptable nontoxic cation.

(E) The compounds of Formula VII wherein A is hydrogen, acetoxy or azido; M is hydrogen or a pharmaceutically acceptable nontoxic cation; and R, $R^1$ and $R^2$ are each (lower)alkyl, (lower)alkynyl or (lower)alkenyl.

(F) The compounds of Formula VII wherein A is acetoxy, hydrogen or azido; M is hydrogen or a pharmaceutically acceptable nontoxic cation and R, $R^1$ and $R^2$ are each (lower)alkyl.

(G) The compound of Formula VII wherein A is acetoxy; M is hydrogen or a pharmaceutically acceptable nontoxic cation; and R, $R^1$ and $R^2$ are each (lower)alkyl.

(H) The compound of Formula VII wherein A is azido; M is hydrogen or a pharmaceutically acceptable nontoxic cation; and R, $R^1$ and $R^2$ are each (lower)alkyl.

A preferential embodiment of the present invention is the group of compounds having the formula

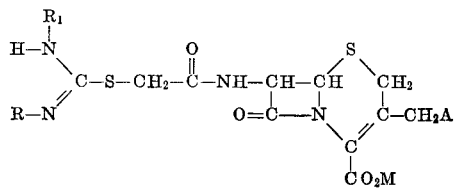

VIII wherein A is hydrogen, (lower)alkanoyloxy, azido, benzoyloxy or a quaternary ammonium radical of the formula

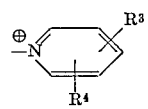

wherein $R^3$ and $R^4$ are each hydrogen or methyl,

M is hydrogen, a pharmaceutically acceptable nontoxic cation, or anionic charge when A is the quaternary ammonium radical; and R and $R^1$ are each (lower)alkyl, (lower)alkynyl, (lower)- alkenyl or (lower)cycloalkyl.

Other preferential embodiments of the present invention are:

(A) The compounds of Formula VIII wherein A is hydrogen, acetoxy, azido or pyridinium; and M is hydrogen, a pharmaceutically acceptable nontoxic cation or an anionic charge when A is pyridinium.

(B) The compounds of Formula VIII wherein A is hydrogen, acetoxy or azido; and M is hydrogen or a pharmaceutically acceptable nontoxic cation.

(C) The compounds of Formula VIII wherein A is acetoxy; and M is hydrogen or a pharmaceutically acceptable nontoxic cation.

(D) The compounds of Formula VIII wherein A is azido; and M is hydrogen or a pharmaceutically acceptable nontoxic cation.

(E) The compounds of Formula VIII wherein A is hydrogen, acetoxy or azido; M is hydrogen or a pharmaceutically acceptable nontoxic cation; and R and $R^1$ are each (lower)alkyl, (lower)alknynyl or (lower)alkenyl.

(F) The compounds of Formula VIII wherein A is acetoxy, hydrogen or azido; M is hydrogen or a pharmaceutically acceptable nontoxic cation; and R and $R^1$ are each (lower)alkyl.

(G) The compound of Formula VIII wherein A is acetoxy; M is hydrogen or a pharmaceutically acceptable nontoxic cation; and R and $R^1$ are each (lower)alkyl).

(H) The compound of Formula VIII wherein A is azido; M is hydrogen or a pharmaceutically acceptable nontoxic cation; and R and $R^1$ are each (lower)alkyl.

A preferred embodiment of the present invention the compounds of Formula VII wherein A is hydrogen, acetoxy or azido; and M is a sodium or potassium cation.

Another preferred embodiment is the compounds of Formula VIII wherein A is hydrogen, acetoxy or azido; and M is a sodium or potassium cation.

The most preferred embodiment of the present invention is the compounds named below, or their pharmaceutically acceptable nontoxic cationic salts, especially the sodium or potassium salts.

(A) 7-[α-(1,3-diethylamidino-2-thio)-acetamido] cephalosporanic acid.
(B) 7-[α-(1,3-dimethylamidino-2-thio)-acetamido] cephalosporanic acid.
(C) 7-[α-(1,3-di-isopropylamidino-2-thio)-acetamido] cephalosporanic acid.
(D) 7-[α-(1,3-di-n-butylamidino-2-thio)-acetamido] cephalosporanic acid.
(E) 7-[α-(1-ethyl-3-methylamidino-2-thio)-acetamido] cephalosporanic acid.
(F) 7-[α-(1-n-butyl-3-methylamidino-2-thio)-acetamido]cephalosporanic acid.
(G) 7-[α-(1,3-di-n-propylamidino-2-thio)-acetamido] cephalosporanic acid.
(H) 7-[α-(1,1-diethyl-3-methylamidino-2-thio)-acetamido]cephalosporanic acid.
(I) 7-[α-(1-methyl-3-n-propylamidino-2-thio)-acetamido]cephalosporanic acid.
(J) 7-[α-(1-ethyl-3-n-propylamidino-2-thio)-acetamido]cephalosporanic acid.
(K) 7-[α-(1,1-di-n-propyl-3-methyl-amidino-2-thio) acetamido]cephalosporanic acid.
(L) 7-[α-(1,1,3-triethylamidino-2-thio)-acetamido] cephalosporanic acid.
(M) 7-[α-(1-n-butyl-3-ethylamidino-2-thio)-acetamido] cephalosporanic acid.
(N) 7-[α-(1-ethyl-3-isopropylamidino-2-thio)-acetamido]cephalosporanic acid.
(O) 7-[α-(1-ethyl-3-cyclopropylamidino-2-thio)-acetamido]cephalosporanic acid.
(P) 7-[α-(1-allyl-3-ethylamidino-2-thio)-acetamido] cephalosporanic acid.
(Q) 7-[α-(1-propargyl-3-ethylamidino-2-thio)-acetamido]cephalosporanic acid.
(R) 7-[α-(1-cyclopentyl-3-ethylamidino-2-thio)-acetamido]cephalosporanic acid.
(S) 7-[α-(1,1-dimethyl-3-ethylamidino-2-thio)-acetamido]cephalosporanic acid.
(T) 7-[α-(1-ethyl-3-n-pentylamidino-2-thio)-acetamido]cephalosporanic acid.
(U) 7-[α-(1,1-di-isopropyl-3-ethylamidino-2-thio)-acetamido]-cephalosporanic acid.
(V) 7-[α-(1-cyclohexyl-3-ethylamidino-2-thio)-acetamido]cephalosporanic acid.
(W) 3-azidomethyl-7-[α-(1-ethyl-3-n-propylamidino-2-thio)acetamido]-3-cephem-4-carboxylic acid.
(X) 7-[α-(1-ethyl-3-n-propylamidino-2-thio)-acetamido]-3-cephem-4-carboxylic acid.
(Y) Potassium or sodium 3-azidomethyl-7-(α-bromoacetamido)-3-cephem-4-carboxylate.
(Z) 3-azidomethyl-7-(α-bromoacetamido)-3-cephem-4-carboxylic acid.

The pharmaceutically acceptable, nontoxic cations include metallic cations such as sodium, potassium, calcium and aluminum and organic amine cations such as trialkylamines, e.g. triethylamine, procaine, dibenzylamine, N-benzyl-β-phenethylamine, 1 - ephenamine, N,N'-bis-dehydroabietylethylenediamine, N - (lower)alkylpiperidines, e.g. N-ethylpiperidine, and other amines which have been used to form salts with benzylpenicillin.

As the compounds of the present invention are capable of forming salts with acids due to their basic nitrogen functions, the compounds are in a sense somewhat amphoteric, often existing as zwitter-ions when M is hydrogen and this invention therefore includes the nontoxic addition salts thereof including the mineral acid addition salts such as the hydrochloride, hydrobromide, hydroiodide, sulfate, sulfamate and phosphate and the organic acid addition salts such as the maleate, acetate, citrate, succinate, benzoate, tartrate, fumarate, malate, mandelate, ascorbate and the like. It is preferred that the acid addition salts be formed and isolated and kept under anhydrous conditions at or below room temperature.

The compounds of the present invention are prepared by a two step process:

Step 1: A compound of the formula

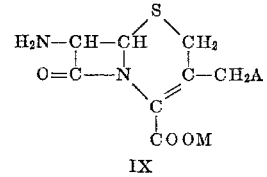

IX wherein A and M are described above (preferably in the form of a neutral salt such as the sodium salt or the triethylamine salt) is mixed with an acid halide having the formula

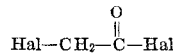

in which Hal is chloro, bromo or iodo, or with its functional equivalent as an acylating agent for a primary amino group, to produce a compound having the formula

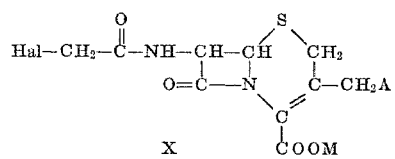

X wherein A, M and Hal are as defined above.

The preferred acylating agent is a haloacetyl halide, most preferably bromoacetyl bromide.

Functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid.

In addition, an acid azide or an active ester or thioester (e.g. with p-nitro-phenol, 2,4 - dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain, 1,008,170 and Novak and Weichet, Experientia XXI/6, 360 (1965)] or by the use of enzymes or of an N,N'-carbonyldiimidazole or an N,N'-carbonylditriazole [cf. South African patent specification 63/2684] of a carbodiimide reagent, especially N,N'-dicyclohexylcarbodiimide, N,N'-diisopropylcarbodiimide or N-cyclohexyl-N'-(2 - morpholinoethyl) carbodiimide; [cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e. an amide or the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole.

Dicarboxylic acids yields diimidazolides. The by-product, imidazole, precipitates and may be separated and the imidazolide isolated, but this is not essential. The methods for carrying out these reactions to produce a cephalosporin and the methods used to isolate the cephalosporin so-produced are well-known in the art (cf. U.S. Pats. Nos. 3,079,314; 3,117,126 and 3,129,224 and British Pats. Nos. 932,644; 957,570 and 959,054).

Step 2: The second step of the process is performed by mixing together material having the Formula X with a basic nitrogen-containing mercaptan having the formula

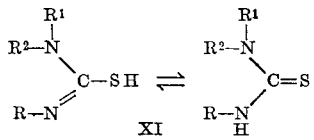

in which R¹, R² and R are (lower)alkyl, (lower)alkynyl, (lower)alkenyl or (lower)cycloalkyl and R² may also be hydrogen, to produce compounds of Formula I, that is

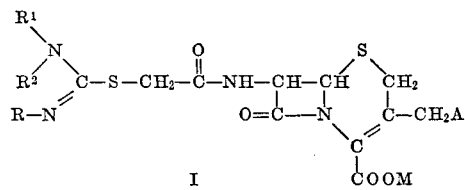

in which R¹, R², R, M and A are as described above.

An alternative route of synthesis of the compounds of the present invention comprises mixing a compound having the formula

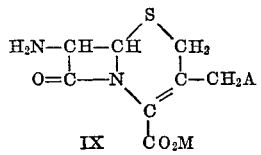

wherein A and M are as described above, with an acid halide having the formula

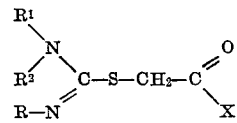

in which R, R¹ and R² are as described above, and X is chloro, bromo or iodo, but preferably chloro, in a molar ratio of at least one mole of acid halide per mole of compound IX, but preferably in a ratio of 1.0 to 1.4 moles of acid halide per mole of compound IX, in an organic solvent selected from the group comprised of methylene chloride, dichloroethane, ethyl acetate, chloroform and the like, but preferably methylene chloride, in the presence of an excess of tertiary amine such as triethylamine, trimethylamine, and the like, but preferably triethylamine, and preferably in a ratio of at least 3 moles of tertiary amine per mole of acid halide at a temperature in the range of about −25° C. to +35° C., but preferably about 0° C. to +5° C.

The starting materials used in the present invention include 7-aminocephalosporanic acid (7-ACA) and derivatives of 7-aminocephalosporanic acid. 7-aminocephalosporanic acid is prepared by hydrolysis of cephalosporin C and has the formula

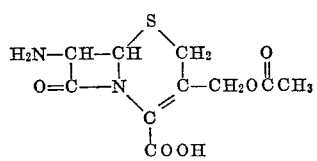

Treatment of cephalosporin C with a tertiary amine, e.g. pyridine, lutidines, picolines and the like, followed by acid hydrolysis produces a nucleus which, in the case of pyridine, has the formula

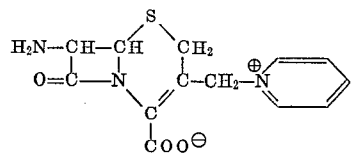

and has been given the name 3-pyridiniummethyl-7-aminodecephalosporanic acid inner salt.

The foregoing nuclei and the preparation thereof are known in the art and are described for example in U.S. Pat. No. 3,117,126 and British Pats. Nos. 932,644; 957,570 and 959,054.

7 - amino - 3 - methyl - 3 - cephem - 4 - carboxylic acid having the formula

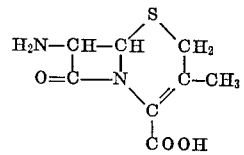

is produced by catalytic reduction of cephalosporin C followed by hydrolytic removal of the 5-aminoadipoyl side chain as described in U.S. Pat. No. 3,129,224.

3-azidomethyl-7-amino-3-cephem-4-carboxylic acid having the formula

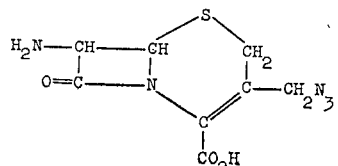

is described by British patent specifications 1,101,422 and 1,104,938. The product can be prepared by the direct treatment of 7–ACA with p-toluene sulfonic acid monohydrate followed by treatment with sodium azide, or by the treatment of cephalosporin C with sodium azide followed by chemical cleavage as described in U.S. patents.

Step 1 of the process for the preparation of the compounds of the instant invention is usually performed by dissolving or suspending a one molar quantity of a compound having the formula XII, XV, XVI or XVII in a 2:1 water-acetone solution which is buffered with 3 moles of a bicarbonate.

The solution is rapidly stirred and cooled to 0° C. and one mole of a haloacetyl halide, preferably bromoacetyl bromide, is added rapidly. The temperature is maintained at 0°–5° C. for ten minutes and then stirred for an additional one hour as the temperature is allowed to approach 25° C. The mixture is concentrated in vacuo at 20° C. to about one-half volume and then doubled in volume by the addition of water. The ether extractions are made and the ether extracts discarded. The aqueous solution is covered by a layer of ethyl acetate or its equivalent, stirred and cooled during which time the solution is acidified to pH 2 by the addition of 40% $H_3PO_4$.

The mixture is filtered and the ethyl acetate layer separated, washed with water, dried over sodium sulfate, filtered, and then treated with a solution of sodium or potassium 2-ethylhexanoate (SEH—KEH) in n-butanol. The oil which forms is scratched to induce crystallization. The resultant crystals are collected, washed several times with acetone and dried in vacuo over $P_2O_5$ to yield sodium or potassium 7-(α-bromoacetamido)-cephalosporanate when the starting material is compound XII and the corresponding derivative when the starting material is compound XV, XVI or XVII.

When the acid form of the salts is desired, a quantity of the sodium or potassium salt is dissolved in 1:1 acetone-water and slowly acidified to pH 2.0 with vigorous scratching and stirring. The free acid crystallizes upon standing and cooling with stirring.

Step 2 of the process for the preparation of the compounds of the instant invention is usually performed by either of two methods.

(A) Aqueous (wet method): The sodium or potassium salt of the 7-(α-bromoacetamido) derivatives obtained in step 1 is dissolved in a solution of sodium bicarbonate containing an equimolar quantity of sodium bicarbonate. An equimolar quantity of the thiourea XI is added rapidly at about room temperature and the reaction mixture is stirred about 30 minutes to 120 minutes. The mixture is extracted several times with ethyl acetate and the aqueous phase is then acidified to pH 2 with a mineral acid such as HCl, $H_3PO_4$, and the like. The aqueous phase is again extracted with ethyl acetate and then extracted with "aerosol OT" in MIBK. The MIBK phase is washed with water, dried over $Na_2SO_4$, filtered and the pH adjusted to 6 with TEA (triethylamine). A solid crystallizes upon scratching to yield the product corresponding to the starting materials.

(B) Anhydrous (dry method): The acid form of the 7-(α-bromoacetamido) derivative obtained in step 1 is dissolved in $CH_2Cl_2$ containing an equimolar quantity of TEA. An equimolar quantity of the thiourea XI is added rapidly at about room temperature. After stirring for about 30 minutes to 120 minutes, acetone is added slowly to the cloud point. Scratching induces crystallization to produce the desired product corresponding to the starting materials.

In the process for the preparation of the compounds of Formulae I and X above, the compounds are sometimes in aqueous solution in the form of their sodium or potassium salt. These compounds in the aqueous phase can then be converted to the free acid, preferably in the cold under a layer of organic solvent by the addition of mineral acid, e.g. 40% $H_3PO_4$ to pH 2–3. The free acid can then be extracted into a water immiscible, neutral organic solvent such as ethyl acetate, the extract washed with water quickly in the cold, if desired, and dried, as with anhydrous $Na_2SO_4$ and the free acid recovered from the organic solvent solution. The product in the ethyl acetate extract in its free acid form can then be converted to any desired metal or amine salt, particularly the pharmaceutically acceptable nontoxic amine salts described above, by treatment with the appropriate base, e.g. a free amine such as procaine base or a solution of potassium 2-ethylhexanoate in dry n-butanol. These salts are usually insoluble in solvents such as ethyl acetate and can be recovered in pure form by simple filtration.

The objects of the present invention have been achieved by the provision according to the present invention, of the process for the synthesis of 7-[α-(substituted-amidino-2-thio)-acetamido]cephalosporanic acids or derivatives therefor which comprises the consecutive steps of (a) mixing together a compound having the formula

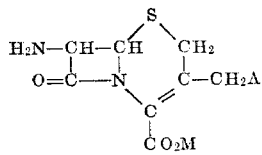

wherein

A is hydrogen, (lower)alkanoyloxy, benzoyloxy, a quaternary ammonium radical, or azido; and M is hydrogen, a pharmaceutically acceptable nontoxic cation or an anionic charge when A is a quarternary ammonium radical; with about 1 to 1.5 molar equivalent, but preferably about 1 molar equivalent, of an α-haloacetyl-halide having the formula

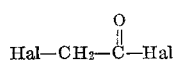

wherein Hal is a halogen selected from the group consisting of chloro, bromo and iodo, but is preferably bromo, or its functional equivalent as an acylating agent for a primary amino group in the presence of about 1 to 4.0 molar equivalents, but preferably 2 to 3 molar equivalents of a base selected from the group consisting of alkali metal carbonates and bicarbonates, i.e., $NaHCO_3$, $Na_2CO_3$, $K_2CO_3$, etc., or pyridine in a water-water-miscible ketonic solvent system such as water in combination with acetone, methyl isobutylketone (MIBK), butanone, etc., but preferably with acetone, at a temperature of about −20° C. to about 50° C., but preferably in the range of 0° C. to 25° C., to produce a compound having the formula

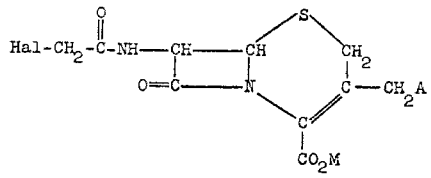

wherein A and M are as described above, and (b) mixing said α-haloacetamido compound with about 1 to 1.5 molar equivalents, but preferably about one molar equivalent, of a mercaptan having the formula

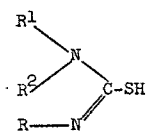

wherein R, $R^1$ and $R^2$ are as previously defined, in the presence of about 1 to 1.5 molar equivalents, but preferably about 1 molar equivalent, of a base selected from the group consisting of an alkali metal hydroxide, bicarbonate and carbonate, i.e., NaOH, KOH, $Na_2CO_3$, $K_2CO_3$, $KHCO_3$, $NaHCO_3$, etc. in an aqueous solvent system at a temperature of about −20° C. to 50° C. but preferably in the range of about 10° C. to about 35° C. to produce a compound having the formula

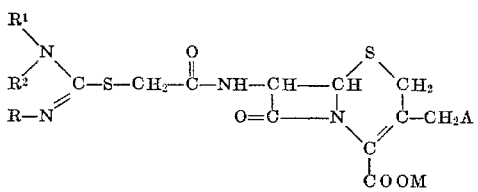

wherein A, R, $R^1$, $R^2$ and M are as described above.

In the treatment of bacterial infections in man, the compounds of this invention are administered orally or parenterally, but preferably parenterally, in accordance with conventional procedures for antibiotic administration, in an amount of from about 5 to 200 mg./kg./day and preferably about 20 mg./kg./day in divided dosage, e.g., three to four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The 1,3 - disubstituted-amidinothioacetamidocephalosporanic acids of the present invention, in common with other compounds related to urea, cannot be adequately defined by any single structural form. This is due in part to the migration of the double bond of the thiourea to form the mercaptan during the condensation with the α-bromoacetamidocephalosporin, e.g.,

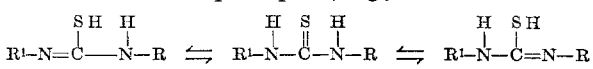

In addition, the 1,3-disubstituted-amidinothioacetamido-carphalosporanic acids of the present invention, in their "neutral" state, exist at least in part as zwitter-ions, e.g.,

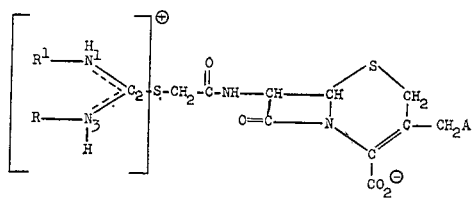

It is because of this zwitter-ion state, that the double bond of the amidino-moiety can migrate over the 3 atom center of the amidino moiety. More classically however, one can say that the 1,3-disubstitutedamidinothio compounds of the present invention can have two possible structures due to the position of the double bond in the amidino-moiety, e.g.,

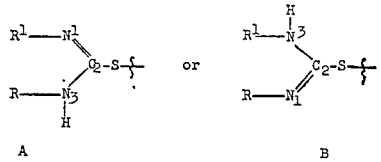

Therefore, when the compound has a 1,3-disubstituted-amidino group, it is to be understood that the double bond can be in either position of the amidino moiety regardless of its structural presentation, i.e., A or B above.

The cephalosporins described in the following examples have shown in vitro antimicrobial activity against the three illustrative microorganism, among many others, as shown in Table I. The Minimum Inhibitory Concentration (M.I.C.) in mcg./ml. versus the indicated microorganism was determined by overnight incubation at 27° C. in Nutrient Broth by serial tube dilution. Most of these compounds have likewise shown in vivo utility in the cure of infectious disease in animals.

The compounds in Table I have the structure

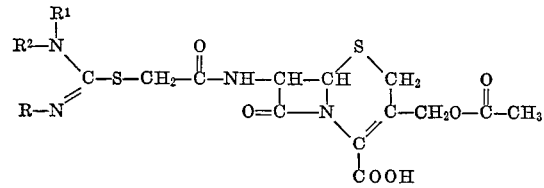

where $R^2$, $R^1$ and R are as indicated.

TABLE I

| Ex. No. | Structure | | | Staph. aureus Bx 1633-2 | E. coli Juhl | Diplococcus pneumoniae +5% serum |
| --- | --- | --- | --- | --- | --- | --- |
| | $R^3$ | $R^1$ | R | | | |
| 2 | Me | H | Me | 1.0 | 8 | 1.3 |
| 1 | Et | H | Et | 0.5 | 1 | 0.04 |
| 4 | iPr | H | iPr | 0.6 | 4 | 0.02 |
| 13 | nPr | H | nPr | 0.3 | 2 | 0.02 |
| 5 | nBu | H | nBu | 0.6 | 8 | 0.02 |
| 14 | sec. Bu | H | Sec. Bu | 0.16 | 32 | 0.02 |
| 15 | iBu | H | iBu | 0.3 | 32 | 0.02 |
| 8 | Et | H | Me | 1.3 | 8 | 1.3 |
| 9 | nBu | H | Me | 0.6 | 2 | 0.6 |
| 17 | Pr | H | Me | 0.6 | 4 | 2.5 |
| 18 | nPr | H | Et | 0.16 | 0.5 | 0.01 |
| 33 [1] | nPr | H | Et | 0.5 | 8 | 0.08 |
| 21 | nBu | H | Et | 0.16 | 1 | 0.02 |
| 22 | iPr | H | Et | 0.5 | 1 | 0.02 |
| 23 | Z | H | Et | 0.3 | 1 | 0.02 |
| 24 | Allyl | H | Et | 0.25 | 2 | 0.02 |
| 25 | Propargyl | H | Et | 0.5 | 2 | 0.08 |
| 26 | Cyclopentyl | H | Et | 0.03 | 8 | 0.01 |
| 27 | Me | Me | Et | >10 | 250 | >10 |
| 28 | n-$C_5$ | H | Et | | | |

| 1,1,3-trisubstituted-amidino compounds | | | | | |
| --- | --- | --- | --- | --- | --- |
| 16 | Et | Et | Me | 1.3 | 4 | 0.3 |
| 20 | Et | Et | Et | 0.6 | 4 | 0.16 |
| 19 | nPr | nPr | Me | 2.5 | >10 | 0.16 |
| 27 | Me | Me | Et | >10 | 250 | >10 |

| 1-monosubstituted-amidino compounds | | | | | |
| --- | --- | --- | --- | --- | --- |
| 3 | Allyl | H | H | 10.0 | 32 | 10.0 |
| 10 | Me | H | H | 10.0 | 16 | >10 |

[1] 3-acetoxymethyl here replaced by 3-azidomethyl.

PREPARATION OF STARTING MATERIALS (A) Preparation of sodium 7-(α-bromoacetamido) cephalosporanate

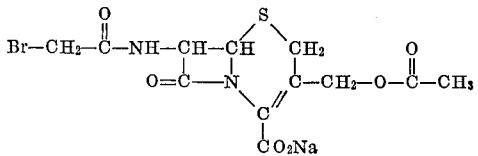

27.2 grams (0.1 moles) of 7-ACA, 33.2 grams (0.3 mole) of $NaHCO_3$, 200 ml. of water and 100 ml. of acetone were mixed together, cooled to 0° C. and stirred rapidly while 20.1 grams (0.1 mole) of bromoacetyl bromide dissolved in 100 ml. of acetone was added in one fast addition. The temperature was kept at 0°–5° C. for ten minutes, then the ice-salt bath was removed and stirring continued for one hour as the temperature approached 25° C. The mixture was concentrated in vacuo at 20° C. to one-half volume and 200 ml. of water added. Two 400 ml. ether extracts were made and discarded. The aqueous solution was covered with 200 ml. of ethyl acetate and vigorously stirred and cooled while being acidified to pH 2 with 40% phosphoric acid. The mixture was filtered, the ethyl acetate layer separated and washed with three 100 ml. portions of water, dried over $Na_2SO_4$, filtered and treated with 30 ml. of sodium 2-ethylhexanoate in n-butanol (34 ml.=0.1 mole). The oil which settled out was scratched to induce crystallization. After stirring for twenty minutes the product was scraped from the sides of the flask and collected. The filter cake was washed with several portions of acetone, air dried, and dried in vacuo over $P_2O_5$. The yield was 22.5 grams and decomposed at 193° C. The infrared (IR) and nuclear magnetic resonance (NMR) spectra were consistent with the above named compound, sodium 7-(α-bromoacetamido)cephalosporanate. (See U.S. Pat. 3,173,916.)

*Analysis.*—Calc'd for $C_{12}H_{12}BrN_2O_6S \cdot Na$ (percent): C, 34.70; H, 2.92. Found (percent): C, 32.45; H, 2.86; $H_2O$, 0.93.

(B) Preparation of sodium 7-(α-bromoacetamido)-3-methyl-3-cephem-3-carboxylate

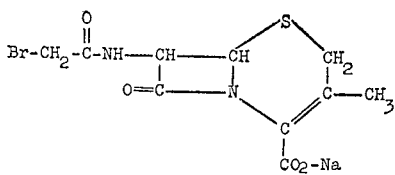

Substitution in the procedure "A" above for the 7-ACA used therein of an equimolar quantity of 7-amino-3-methyl - 3 - cephem-4-carboxylic acid produced sodium 7-(α-bromoacetamido)-3-methyl - 3 - cephem-4-carboxylate, 22.4 g., M.P. 217° C. with decomposition.

(C) Conversion of sodium salts to free acids

The sodium salts, sodium 7-(α-bromoacetamido)cephalosporanate, sodium 3-methyl-7-(α-bromoacetamido)-3-cephem-4-carboxylate and sodium 3-azidomethyl-7-(α-bromacetamido)-3-cephem-3-carboxylate are converted to their free acid forms by dissolving them in 1:1 water-acetone, acidifying to about pH 2.0 with a strong mineral acid, e.g., $H_3PO_4$, HCl and the like. The product will crystallize upon scratching with a glass rod and is collected by filtration. However, if the product oils out of solution, then extract with MIBK, dry over sodium sulfate, concentrate in vacuo, add acetone to the cloud point and scratch with a glass rod to induce crystallization. Cool for several hours and collect the crystals by filtration. (See U.S. Pat. No. 3,173,916.) 7-[α-bromoacetamido] cephalosporanic acid has a melting point of 150° C. decomposition.

The following examples will serve to illustrate this invention without limiting it thereto. All temperatures are given in degrees centigrade.

DESCRIPTION OF THE PREFERRED EMBODIMENTS

EXAMPLE 1

7-[α-(1,3-diethylamidino-2-thio)-acetamido] cephalosporanic acid

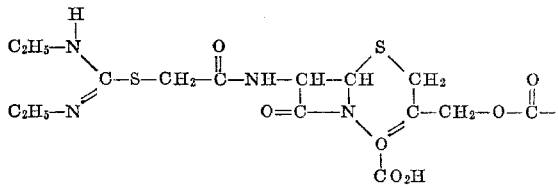

To a stirred suspension of 3.93 grams (0.01 mole) of 7-[α-bromoacetamido) cephalosporanic acid in 100 ml. of methylene chloride was added 1.4 ml. (0.01 mole) of triethylamine (TEA) followed by 1.32 grams (0.01 mole) of 1,3-diethylthiourea (Eastman Organic Chemicals). The resulting clear solution (22° C.) was stirred for two and one half hours during which an oil separated. The oil was triturated with $CH_2Cl_2$ and anhydrous ether. The resulting solids were filtered off, washed with ether and vacuum dried over $P_2O_5$ to give 3.65 grams, dec. pt. 130° slow; the infrared (IR) and nuclear magnetic resonance spectra (NMR) were entirely consistent with the desired structure.

Analysis.—Calc'd for $C_{17}H_{24}N_4O_6S_2$ (percent): C, 45.62; H, 5.43; N, 12.58. Found (percent): C, 45.63; H, 6.69; N, 11.64.

EXAMPLE 2

7-[α-(1,3-dimethylamidino-2-thio)-acetamido] cephalosporanic acid

Substitution in the procedure of Example 1 for the 1,3-diethylthiourea used therein of an equimolar quantity of 1,3-dimethylthiourea produced the title compound. The IR and NMR spectra were entirely consistent with the desired structure, M.P. decomposition 135° C.

Analysis.—Calc'd for $C_{15}H_{20}N_4O_6S_2$ (percent): C, 43.26; H, 4.86; N, 13.46; S, 15.41. Found (percent): C, 42.99; H, 5.79; N, 13.10; S, 14.65.

EXAMPLE 3

7-[α-(1-allylamidino-2-thio)-acetamido] cephalosporanic acid

To a stirred suspension of 3.93 grams (0.01 mole) of 7-[α-bromoacetamido]cephalosporanic acid in 50 ml. of $CH_2Cl_2$ was added 1.4 ml. (0.01 mole) of triethylamine (TEA), followed by 1.16 grams (0.01 mole) of 1-allyl-thiourea (Eastman). After 30 minutes the oil which separated was triturated with fresh $CH_2Cl_2$, filtered and dried in vacuo over $P_2O_5$. Yield 3.65 grams, decomposition 110° C. (slow). The IR and NMR spectra were entirely consistent with the desired structure.

Analysis.—Calc'd for $C_{16}H_{20}N_4O_6S_2$ (percent): C, 44.86; H, 4.72; N, 13.08. Found (percent): C, 43.10; H, 5.51; N, 12.83.

Karl Fischer $H_2O$=4.5%.

EXAMPLE 4

7-[α-(1,3-diisopropylamidino-2-thio)-acetamido] cephalosporanic acid

To a stirred suspension of 3.93 grams (0.01 mole) of 7-[α-bromoacetamido]cephalosporanic acid in 50 ml. of $CH_2Cl_2$ was added 1.4 ml. of TEA followed by 1.6 grams (0.01 mole) of N,N'-di-isopropylthiourea (Aldrich). After stirring 30 minutes, 50 ml. of acetone was added slowly. Scratching induced crystallization. The product was filtered off, washed with 10× 30 ml. of $CH_2Cl_2$ and dried in vacuo over $P_2O_5$ to give 3.72 grams, M.P. decomposition 150° C. The IR spectrum was entirely consistent with the desired structure.

Analysis.—Calc'd for $C_{19}H_{28}N_4O_6S_2$ (percent): C, 48.20; H, 5.98; N, 11.48. Found (percent): C, 46.66; H, 6.41; N, 11.59.

Karl Fischer $H_2O$=3.64%.

EXAMPLE 5

7-[α-(1,3-di-n-butylamidino-2-thio)-acetamido] cephalosporanic acid

Substitution in the procedure of Example 4 for the N,N'-di-isopropylthiourea used therein of 1.88 grams (0.01 mole) of 1,3-di-n-butyl-2-thiourea (Aldrich) produced 4.8 grams of title product, dec. Pt. 170° C. (slow). The NMR and IR spectrum were entirely consistent with the desired structure.

Analysis.—Calc'd for $C_{21}H_{32}N_4O_6S_2$ (percent): C, 50.40; H, 6.46; N, 11.20. Found (percent): C, 47.25; H, 6.56; N, 10.20.

Karl Fischer $H_2O$=1.79%.

EXAMPLE 6

1-methyl-3-ethylthiourea (U.S. Pat. 2,804,447)

To a stirred solution of 13.5 grams (0.3 mole) of ethylamine (EKC) in 200 ml. of $CH_2Cl_2$ was added with cooling (10° C.), a solution of 22 grams (0.3 mole) of methyl isothiocyanate (EKC) in 100 ml. of $CH_2Cl_2$ over a twenty minute period. After stirring an hour at room temperature (22° C. the $CH_2Cl_2$ was removed in vacuo at 25° C. The residual oil was taken up in 700 ml. of boiling ether, filtered, cooled, and scratched. There were obtained 24 grams of white crystals, M.P. 54–55° C. The IR and NMR spectra were entirely consistent with the desired structure.

Aanalysis.—Calc'd for $C_2H_{10}N_2S$ (percent): C, 40.68; H, 8.54; N, 23.66. Found (percent): C, 40.88; H, 9.15; N, 23.99.

EXAMPLE 7

1-methyl-3-n-butylthiourea (U.S. Pat. 2,804,447)

Substitution in the procedure of Example 6 for the ethylamine used therein of an aquimolar quantity of n-butylamine produced the titled compound, 36 grams, M.P. 42° C. The IR and NMR spectra were entirely consistent with the desired structure. (n-Butylamine and methyl isothiocyanate from Eastman Kodak (EKC).)

EXAMPLE 8

7-[α-(1-ethyl-3-methylamidino-2-thio)-acetamido] cephalosporanic acid

To a stirred suspension of 3.93 grams (0.01 mole) of 7-[α-bromoacetamido]cephalosporanic acid in 50 ml. of $CH_2Cl_2$ was added 1.4 ml. of TEA. To the resulting solution was added 1.18 grams (0.01 mole) of 1-ethyl-3-methylthiourea. The resulting clear solution was stirred 2 hours and the crystalline precipitate filtered off, washed with 3× 50 ml. of $CH_2Cl_2$, air dried and vacuum dried over $P_2O_5$. Yield 4.22 grams, dec. 170° C. (slow). The IR and NMR spectra were entirely consistent with the desired structure.

Analysis.—Calc'd for $C_{18}H_{26}N_4O_6S_2$ (percent): C, 44.55; H, 5.15; N, 13.00. Found (percent): C, 39.15; H, 5.79; N, 11.70.

Karl Fischer $H_2O$=6.1%.

EXAMPLE 9

7-[α-(1-n-butyl-3-methylamidino-2-thio)acetamido] cephalosporanic acid

Substitution in the procedure of Example 8 for the 1-ethyl-3-methylthiourea used therein of 1.46 grams (0.01 mole) of 1-n-butyl-3-methylthiourea produced the title compound, 4.5 grams, dec. point 180° C. (slow). The IR and NMR spectra were entirely consistent for the desired structure.

*Analysis.*—Calc'd for $C_{18}H_{26}N_4O_6S_2$ (percent): C, 47.06; H, 5.71; N, 12.20. Found (percent): C, 44.09; H, 6.23; N, 11.844.

Karl Fischer $H_2O = 7.3\%$.

EXAMPLE 10

7-[α-(1-methylamidino-2-thio)-acetamido] cephalosporanic acid

Substitution in the procedure of Example 8 for the 1-ethyl-3-methylthiourea used therein of an equimolar quantity of N-methylthiourea produced 3.76 grams of titled product, dec. point 145° C. (slow) (the N-methylthiourea was obtained from Aldrich). The IR and NMR spectra were consistent with the desired structure.

*Analysis.*—Calc'd for $C_{14}H_{18}N_4O_6C_2$ (percent): C, 41.79; H, 4.51; N, 13.93. Found (percent): C, 40.10; H, 5.30; N, 15.05.

Karl Fischer $H_2O = 4.9\%$.

EXAMPLE 11

1-propyl-3-methylthiourea

Substitution in the procedure of Example 6 for the ethylamine used therein of an equimolar quantity of 1-propylamine produced 37.95 grams, M.P. 77–81° C., of the title compound.

*Analysis.*—Calc'd for $C_5H_{12}N_2S$ (percent): C, 45.45; H, 9.09. Found (percent): C, 45.67; H, 9.46; N, 21.12.

EXAMPLE 12

1,1-diethyl-3-methylthiourea

Substitution in the procedure of Example 6 for the ethylamine used therein of an aquimolar quantity of N,N-diethylamine produced an oil which would not crystallize. The crude thiourea was used as in Example 16.

EXAMPLE 13

7-[α-(1,3-di-n-propylamidino-2-thio)-acetamido]- cephalosporanic acid

Substitution in the procedure of Example 4 for the N,N'-di-isopropylthiourea used therein of an equimolar quantity of N,N'-di-n-propylthiourea produced the title compound, 3.85 grams, dec. 130° C. slow (the N,N'-di-n-propylthiourea was obtained from Frinton Laboratories). The IR and NMR spectra were well defined and consistent with the desired structure.

*Analysis.*—Calc'd for $C_{19}H_{28}N_4O_6S_2$ (percent): C, 48.20; H, 5.92; N, 11.84. Found (percent): C, 46.56; H, 6.49; N, 11.61.

Karl Fischer $H_2O = 3.12\%$.

EXAMPLE 14

7-[α-(1,3-di-sec-butylamidino-2-thio)-acetamido]- cephalosporanic acid

Substitution in the procedure of Example 4 for the N,N'-di-isopropylthiourea used therein of an equimolar quantity of N,N'-di-sec.-butylthiourea produced the title compound, 3.45 grams, M.P. dec. 140° C. (slow). The IR and NMR spectra were consistent with the desired structure. (The N,N'-di-sec-butylthiourea was obtained from Frinton Laboratories.)

*Analysis.*—Calc'd for $C_{21}H_{32}N_4O_6S_2$ (percent): C, 50.40; H, 6.46; N, 11.20. Found (percent): C, 48.71; H, 6.95; N, 11.00.

Karl Fischer $H_2O = 6.49\%$.

EXAMPLE 15

7-[α-(1,3-di-isobutylamidino-2-thio)-acetamido]- cephalosporanic acid

Substitution in the procedure of Example 4 for the N,N'-di-isopropylthiourea used therein of an equimolar quantity of N,N'-di-isobutylthiourea produced the title compound, 3.75 grams, M.P. dec. 145° C. (The N,N'-di-isobutylthiourea was obtained from Frinton Laboratories.) The IR and NMR spectra were consistent with the desired structure.

*Analysis.*—Calc'd for $C_{21}H_{32}N_4O_6S_2$ (percent): C, 50.40; H, 6.46; N, 11.20. Found (percent): C, 48.60; H, 6.91; N, 11.14.

Karl Fischer $H_2O = 4.11\%$.

EXAMPLE 16

7-[α-(1,1-diethyl-3-methylamidino-2-thio)-acetamido]- cephalosporanic acid

To a stirred solution of 4.15 grams (0.01 mole) of sodium 7-[α-bromoacetamido]-cephalosporanate and 0.84 gram (0.01 mole) of NaHCO$_3$ in 50 ml. of H$_2$O, was added 1.46 grams (0.01 mole) of 1,1-diethyl-3-methylthiourea. After one-half hour the mixture was extracted with two 50 ml. ethyl acetate extracts which were discarded. The pH was brought to 2 with 40% H$_3$PO$_4$ and the extraction repeated. The ethyl acetate extracts were discarded. The aqueous phase was then extracted with a solution of 2.4 grams of "Aerosol OT" (a long chain alkylamino-sulfonic acid) in 25 ml. of methyl isobutyl ketone (MIBK). The MIBK layer was separated, washed with H$_2$O, dried briefly over Na$_2$SO$_4$, filtered and the pH adjusted to 6 with TEA. The oil which separated was triturated with fresh MIKB, filtered and dried thoroughly. The yield was 1.05 grams dec. slowly 80° C. The IR and NMR spectra were consistent with the desired structure.

*Analysis.*—Calc'd for $C_{18}H_{36}N_4O_6S_2$ (percent): C, 50,00; H, 5.88; N, 12.20. Found (percent): C, 44.62; H, 6.44; N, 9.96.

Karl Fischer $H_2O = 5.8\%$.

EXAMPLE 17

7-[α-(1-methyl-3-n-propylamidino-2-thio)-acetamido]- cephalosporanic acid

Substitution in the procedure of Example 8 for the 1-ethyl-3-methylthiourea used therein of an equimolar quantity of 1-methyl-3-propylthiourea produced the title compound, 3.85 grams, dec. 130° (slow). The IR and NMR spectra were consistent with the desired structure. The 1-propyl-3-methylthiourea was prepared as in Example 11.

*Analysis.*—Calc'd for $C_{17}H_{24}N_4O_6S_2$ (percent): C, 43.50; H, 5.39; N, 12.60. Found (percent): C, 40.87; H, 5.95; N, 11.96.

Karl Fischer $H_2O = 3.3\%$.

EXAMPLE 18

7-[α-(1-ethyl-3-n-propylamidino-2-thio)-acetamido]- cephalosporanic acid (A) 1-ethyl-3-n-propylthiourea: To a stirring cold (5° C.) solution of 17.7 grams (0.3 mole) of n-propylamine (Eastman Chemical Company) in 150 ml. of methylene chloride was added dropwise, over a period of 30 minutes, a solution of 26 grams (0.3 mole) of ethyl isothiocyanate (Aldrich) in 100 ml. of methylene chloride. The ice bath was removed, and the solution stirred 1 hour. The methylene chloride was removed at 20° C. in vacuo to afford a crystalline solid. No suitable recrystallization solvent was found. Melting point 45–47° C. The yield was 43 grams (nearly quantitative).

*Analysis.*—Calc'd for $C_6H_{14}N_2S$ (percent): C, 49.32; H, 9.66; N, 19.18. Found (percent): C, 49.71; H, 9.75; N, 19.23.

(B) 7-[α-(1-ethyl-3-n-propylamidino - 2 - thio)acetamido]-cephalosporanic acid: To a stirring solution of 1.4 ml. (0.01 mole) trimethylamine and 3.93 grams (0.01 mole) 7-[α-bromoacetamido]-cephalosporanic acid in 50 ml. (0.01 mole) triethylamine and 3.93 grams (0.01 mole) of 1-ethyl-3-n-propylthiourea. The solution was stirred 30 minutes, the vessel scratched with a glass rod and after another 30 minutes, the product was filtered, washed with 3× 50 ml. of methylene chloride and air dried. The yield was 3.76 grams after vacuum drying over $P_2O_5$, decomposition point of 145° (slowly decomposes).

*Analysis.*—Calc'd for $C_{14}H_{18}N_4O_6S_2$ (percent): C, 41.79; H, 4.51. Found (percent): C, 40.10; H, 5.30.

Karl Fischer $H_2O$=4.9%.

EXAMPLE 19

7-[α-(1,1-di-n-propyl-3-methylamidino-2-thio)-acetamido]-cephalosporanic acid

Substitution in the procedure of Example 16 for the 1,1-diethyl-3-methylthiourea used therein of 0.01 mole of 1,1-di-n-propyl-3-methylthiourea produced the title compound, M.P. dec. 80° C., 1.0 g. The IR and NMR spectra were consistent with the desired structure.

*Analysis.*—Calc'd for $C_{20}H_3N_4O_6S_2$ (percent): C, 50.00; H, 6.16; N, 11.50; S, 13.14. Found (percent): C, 47.53; H, 6.89; N, 10.59; S, 12.07.

Karl Fischer $H_2O$=4.10%.

EXAMPLE 20

7-[α-(1,1,3-trimethylamidino-2-thio)-acetamido]-cephalosporanic acid

Substitution in the procedure of Example 16 for the 1,1-diethyl-3-mehtylthiourea used therein of 0.01 mole of 1,1,3-triethylthiourea produced the title compound, 1.3 g., M.P. dec. 80° C. The IR and NMR spectra were consistent with the structure.

*Analysis.*—Calc'd for $C_{19}H_{28}N_4O_6S_2$ (percent): C, 48.30; H, 5.93; N, 11.86; S, 13.56. Found (percent): C, 48.18; H, 6.91; N, 10.62; S, 12.49.

Karl Fischer $H_2O$=4.07%.

EXAMPLE 21

7-[α-(1-n-butyl-3-ethylamidino-2-thio)-acetamido]-cephalosporanic acid

Substitution in the procedure of Example 8 for the 1-ethyl-3-methylthiourea used therein of 0.01 mole of 1-n-butyl-3-ethylthiourea produced the title compound, 2.40 g., M.P. dec. 130° C. The IR and NMR were consistent with the desired product.

*Analysis.*—Calc'd for $C_{19}H_{28}N_4O_6S_2$ (percent): C, 48.20 H, 5.92; N, 11.84. Found (percent): C, 47.91; H, 6.72; N, 11.37.

Karl Fischer $H_2O$=3.28%.

EXAMPLE 22

7-[α-(1-ethyl-3-isopropylamidino-2-thio)-acetamido]-cephalosporanic acid

Substitution in the procedure of Example 8 for the 1-ethyl-3-methylthiourea used therein of 0.01 mole of 1-ethyl-3-isopropylthiourea produced the title compound 3.45 g., M.P. dec. 130° C. The IR and NMR were consistent with the desired product.

*Analysis.*—Calc'd for $C_{18}H_{26}N_4O_6S_2$ (percent): C, 50.00; H, 5.88; N, 12.20; S, 14.00. Found (percent): C, 44.43; H, 6.35; N, 11.44; S, 13.36.

Karl Fischer $H_2O$=6.95%.

EXAMPLE 23

7-[α-(1-ethyl-3-cyclopropylamidino-2-thio)-acetamido]-cephalosporanic acid

Substitution in the procedure of Example 16 for the 1,1-diethyl-3-methylthiourea used therein of 0.01 mole of 1-ethyl-3-cyclopropylthiourea produced the title compound, 1.75 g., M.P. dec. 115° C. The IR and NMR were consistent with the desired product.

*Analysis.*—Calc'd for $C_{18}H_{24}N_4O_6S_2$ (percent): C, 50.00 H, 5.88; N, 12.26; S, 14.00. Found (percent): C, 48.15; H, 6.69; N, 11.12; S, 11.57.

Karl Fischer $H_2O$=2.5%.

EXAMPLE 24

7-[α-(1-allyl-3-ethylamidino-2-thio)-acetamido]-cephalosporanic acid

Substitution in the procedure of Example 4 for the N,N'-di-isopropylthiourea used therein of 0.01 mole of 1-allyl-3-ethylthiourea produced the title compound, 3.25 g., M.P. dec. 120° C. The IR and NMR were consistent with the desired structure.

*Analysis.*—Calc'd for $C_{18}H_{23}N_4O_6S_2$ (percent): C, 47.50; H, 5.06; N, 12.08; S, 14.06. Found (percent): C, 45.08; H, 5.84; N, 11.99; S, 14.55.

Karl Fischer $H_2O$=4.0%.

EXAMPLE 25

7-[α-(1-propargyl-3-ethylamidino-2-thio)acetamido]-cephalosporanic acid

Substitution in the procedure of Example 4 for the thiourea used therein of 0.01 mole of 1-propargyl-3-ethylthiourea produced the title compound, 2.67 g., M.P. dec. 120° C. The IR and NMR were consistent with the desired structure.

*Analysis.*—Calc'd for $C_{18}H_{22}N_4O_6S_2$ (percent): C, 47.50; H, 5.06; N, 12.08; S, 14.07. Found (percent): C, 46.46; H, 5.39; N, 12.48; S, 14.07.

Karl Fischer $H_2O$=5.03%.

EXAMPLE 26

7-[α-(1-cyclopentyl-3-ethylamidino-2-thio)-acetamido]-cephalosporanic acid

Substitution in the procedure of Example 4 for the thiourea used therein of 0.01 mole of 1-cyclopentyl-3-ethylthiourea produced the title compound, 4.15 g., M.P. dec. 130° C.

*Analysis.*—Calc'd for $C_{20}H_{22}N_4O_6S_2$ (percent): C, 50.41; H, 5.60; N, 11.57; S, 13.09. Found (percent): C, 47.49; H, 6.32; N, 11.35; S, 12.68.

Karl Fischer $H_2O$=5.41%.

EXAMPLE 27

7-[α-(1,1-dimethyl-3-ethylamidino-2-thio)-acetamido]-cephalosporanic acid

Substitution in the procedure of Example 16 for the thiourea used therein of 0.01 mole of 1,1-dimethyl-3-ethylthiourea produced the title compound, 0.90 g., M.P. dec. 115° C.

*Analysis.*—Calc'd for $C_{17}H_{24}N_4O_6S_2$ (percent): C, 45.84; H, 5.44; N, 12.58. Found (percent): C, 45.97; H, 6.41; N, 10.87.

Karl Fischer $H_2O$=3.9%.

EXAMPLE 28

7-[α-(1-ethyl-3-n-pentylamidino-2-thio)-acetamido]-cephalosporanic acid

Substitution in the procedure of Example 8 for the thiourea used therein of 0.01 mole of 1-ethyl-3-pentylthiourea produced the title compound, 3.50 g., M.P. dec. 130° C.

*Analysis.*—Calc'd for $C_{20}H_{30}N_4O_6S_2$ (percent): C, 49.32; H, 6.21; N, 11.49. Found (percent): C, 47.13; H, 6.29; N, 11.29.

Karl Fischer $H_2O$=2.3%.

EXAMPLE 29

Preparation of thioureas

Substitution in the procedure of Example 6 for the ethylamine and methyl isothiocyanate used therein of equimolar quantities of the appropriate amine and isothiocyanate produced the following thioureas:

(1) 1,1-dimethyl-3-ethylthiourea, oil.
(2) 1,1-di-n-propyl-3-methylthiourea, M.P. 152–154° C.
(3) 1,1,3-triethylthiourea, oil.
(4) 1,1-di-n-propyl-3-ethylthiourea, oil.

(5) 1-ethyl-3-n-butylthiourea, oil.
(6) 1-ethyl-3-isopropylthiourea, M.P. 108–110° C.
(7) 1-cyclopropyl-3-ethylthiourea, M.P. 101–104° C.
(8) 1-allyl-3-ethylthiourea, M.P. 42–45° C.
(9) 1-ethyl-3-propargylthiourea, M.P. 67–71° C.
(10) 1-ethyl-3-cyclopentylthiourea, M.P. 104.5–106° C.
(11) 1-ethyl-3-cyclohexylthiourea, M.P. 101–103° C.
(12) 1-ethyl-3-n-pentylthiourea, M.P. 52–55° C.

EXAMPLE 30

7-[α-(1,1-di-isopropyl-3-ethyl-amidino-2-thio)-acetamido]-cephalosporanic acid

Substitution in the procedure of Example 4 for the 1,3-di-isopropylthiourea used therein of an equimolar quantity of 1,1-di-isopropyl-3-ethylthiourea produces the title compound.

EXAMPLE 31

7-[α-(1-cyclohexyl-3-ethylamidino-2-thio)-acetamido]-cephalosporanic acid

Substitution in the procedure of Example 4 for the thiourea used therein of an equimolar quantity of 1-cyclohexyl-3-ethylthiourea produces the title compound.

EXAMPLE 32

Preparation of sodium 3-azidomethyl-7-(α-bromo-acetamido)-3-cephem-4-carboxylate Bromoacetyl bromide (5 g., 0.028 mole) was added with vigorous stirring to a cooled (0° C.) solution of 5 grams (0.02 mole) of 3-azidomethyl-7-amino-3-cephem-4-carboxylic acid, 5 grams of $NaHCO_3$, 50 ml. of water and 25 ml. of acetone over at 5 minute period. After 30 minutes the solution was diluted with an equal volume of water and then extracted with a 200 ml. portion of ether which was discarded. The aqueous layer was cooled and acidified to pH 2 with $40H_3PO_4$ under a layer of ethyl acetate (100 ml.). The ethyl acetate layer was washed with water, dried over anhydrous sodium sulfate, filtered and treated with 0.02 mole of sodium ethylhexanoate in n-butanol. The ethyl acetate was partially removed in vacuo at 20° C. until the product partially crystallized. The product was cooled, filtered and the solid dried to yield 2 grams of the title compound.

EXAMPLE 33

Preparation of 3 - azidomethyl - 7-[α-(1-ethyl-3-n-propylamidino-2-thio)-acetamido]-3-cephem-4-carboxylic acid 1-ethyl-3-propylthiourea (0.73 g., 0.005 mole) was added to a stirred solution of sodium 3-azidomethyl-7-(α-bromoacetamido)-3-cephem-4-carboxylic acid in water (0.005 mole), followed by the addition of 0.42 gram (0.005 mole) of sodium bicarbonate. After one hour, two 50 ml. ethyl acetate extractions were made and discarded. The aqueous phase was acidified under a layer of ethyl acetate (50 ml.) to a pH of 2 with 40% $H_3PO_4$. The ethyl acetate layer was discarded and the aqueous phase extracted with a solution of 1.3 g. of "Aerosol OT" in 50 ml. methyl isobutyl ketone (MIBK). The MIBK layer was washed twice with water, dried over anhydrous sodium sulfate, filtered and the pH adjusted to 6 with triethylamine. The oil which separated was triturated with acetone, filtered as a solid and dried in vacuo to yield 110 mg., M.P. dec. 146° C., of the title product.

Analysis.—Calc'd for $C_{16}H_{23}N_7O_4S_2$ (percent): C, 43.44; H, 5.25; N, 22.20. Found (percent): C, 42.00; H, 5.50; N, 18.85.

The IR and NMR spectra were consistent with the desired structure.

EXAMPLE 34

Preparation of 7 - [α-(1-ethyl-3-n-propylamidino-2-thio)-acetamido]-3-(1-pyridylmethyl)-3-cephem-4-carboxylic acid betaine

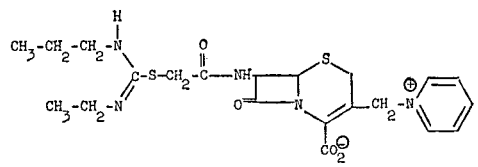

A mixture of 7-[α-(1-ethyl-3-n-propylamidino-2-thio)-acetamido]cephalosporanic acid (20 g.) 0.43 mole, potassium thiocyanate (90.8 g., 0.95 mole), pyridine (5 ml.) and 1 ml. of 85% phosphoric acid in 20 ml. of water, pH 6.5, is heated at 60° C. for five hours with stirring. The mixture is cooled to 20° C. and diluted to 400 ml. with water and then extracted with chloroform (5× 200 ml. portions) and then subjected to in vacuo evaporation to remove any residual chloroform. After cooling to 0° C., the aqueous layer is acidified to pH 2 by the dropwise addition of 6 N hydrochloric acid while vigorously stirring. The turbid solution deposits crystals which are then slurried with 30 ml. of water and 100 ml. of 25% "Amberlite LA–1 (basic)" [1] in MIBK for 30 minutes. The resultant aqueous solution is extracted with three 30 ml. portions of 25% "Amberlite LA–1 (acetate form)" [2] in MIBK, followed by one 50 ml. portion of MIBK. After stirring the aqueous phase for one–three hours, the betaine is collected as crystals.

J. Medicinal Chem., vol. 9, pp. 746–750.

EXAMPLE 35

Preparation of 7-[α-(1-ethyl-3-n-propylamidino-2-thio)-acetamido-3-methyl-3-cephem-4-carboxylic acid Substitution in the procedure of Example 18 for the 7-(α-bromoacetamido)-cephalosporanic acid used therein of an equimolar quantity of 3-methyl-7-(α-bromoacetamido)-3-cephem-4-carboxylic acid produces the title compound.

EXAMPLE 36

Other 3-azidomethyl-7-[α-(substituted-amidino-2-thio)-acetamido]-3-cephem-4-carboxylic acids Substitution in the procedure of Example 33 for the thiourea used therein of an equimolar weight of each of the following thioureas will produce the 3-azidomethyl-3-cephem-4-carboxylic acids corresponding to the thiourea used:

(1) 1,3-diethylthiourea
(2) 1,3-dimethylthiourea
(3) 1,3-di-isopropylthiourea
(4) 1,3-di-n-butylthiourea
(5) 1-methyl-3-ethylthiourea
(6) 1-methyl-3-n-butylthiourea
(7) 1-ethyl-3-methylthiourea
(8) 1-n-butyl-3-methylthiourea
(9) 1-methyl-3-n-propylthiourea
(10) 1,1-diethyl-3-methylthiourea
(11) 1,3-di-n-propylthiourea
(12) 1,3-di-sec-butylthiourea
(13) 1,3-di-isobutylthiourea
(14) 1,1-diethyl-3-methylthiourea
(15) 1-methyl-3-n-propylthiourea
(16) 1,1-dimethyl-3-ethylthiourea
(17) 1,1-di-n-propyl-3-methylthiourea
(18) 1,1,3-triethylthiourea
(19) 1,1-di-n-propyl-3-ethylthiourea
(20) 1-ethyl-3-n-butylthiourea
(21) 1-ethyl-3-isopropylthiourea

---

[1] Amberlite LA–1 (basic) is a high molecular weight water insoluble liquid secondary amine commercially available from Rohm and Haas.
[2] Amberlite LA–1 (acetate form) is prepared from Amberlite LA–1 (basic) as follows: To one liter of Amberlite LA–1 and 3 liters of methyl isobutyl ketone was added 120 ml of glacial acetic acid. The mixture was stirred five minutes. The mixture was then stirred with 800 ml. of water for 25 minutes, following which the organic layer was separated for use.

(22) 1-cyclopropyl-3-ethylthiourea
(23) 1-allyl-3-ethylthiourea
(24) 1-ethyl-3-propargylthiourea
(25) 1-ethyl-3-cyclopentylthiourea
(26) 1-cyclohexyl-3-ethylthiourea
(27) 1-ethyl-3-n-pentylthiourea

EXAMPLE 37

Other 7-[α-(substituted-amidino-2-thio)acetamido]-3-methyl-3-cephem-4-carboxylic acid Substitution in the procedure of Example 19 for the 7-[α-bromoacetamido)-cephalosporanic acid used therein of an equimolar quantity of 7 - (α - bromoacetamido)-3-methyl-3-cephem-4-carboxylic acid and for the 1-ethyl-3-n-propylthiourea used therein of an equimolar quantity of each of the thioureas listed in Example 36 will produce the 3-methylceph-3-em-4-carboxylic acid corresponding to the thiourea used.

EXAMPLE 38

Substitution in the procedure of Example 34 for the 7-[α - (1 - ethyl - 3 - n - propylamidino-2-thio)acetamido]-cephalosporanic acid used therein of any of the cephalosporanic acids prepared from the thioureas listed in Example 36 will produce the corresponding pyridinium cephalosporin (betaine).

EXAMPLE 39

7-[α-(1,3-diethylamidino-2-thio)-acetamido]cephalosporanic acid $$\text{Structure: } C_2H_5-NH-C(=N-C_2H_5)-S-CH_2-C(=O)-NH-CH-CH-S-CH_2-C(-CH_2-O-C(=O)-CH_3)=... \text{ with } CO_2H$$

To a stirred suspension of 3.93 grams (0.01 mole) of 7-[α-bromoacetamido]cephalosporanic acid in 100 ml. of methylene chloride was added 1.4 ml. (0.01 mole) of triethylamine (TEA) followed by 1.32 grams (0.01 mole) of 1,3-diethylthiourea (Eastman Organic Chemicals). The resulting clear solution (22° C.) was stirred and a crystalline product formed. The resulting solids were filtered off, washed with $CH_2Cl_2$ and air dried to give 3.05 grams, dec. pt. 130° slow; the infrared (IR) and nuclear magnetic resonance spectra (NMR) were entirely consistent with the desired structure.

*Analysis.*—Calc'd for $C_{17}H_{24}N_4O_6S_2$ (percent): C, 45.62; H, 5.43; N, 12.58. Found (percent): C, 45.54; H, 5.83; N, 12.40.

I claim:

1. A compound having the formula

[Structure with R, R¹, R² substituents, and variable A, COOM group]

wherein A is hydrogen, (lower)alkanoyloxy, azido, benzoyloxy or a quaternary ammonium radical of the formula

[Pyridinium structure with R³, R⁴]

wherein $R^3$ and $R^4$ are each hydrogen or methyl;

M is hydrogen, a pharmaceutically acceptable nontoxic cation, or an ionic charge when A is the quaternary ammonium radical; and R, $R^1$ and $R^2$ are each (lower)alkyl, (lower)alkynyl, (lower)alkenyl or (lower)cycloalkyl and $R^2$ may also be hydrogen; or a nontoxic, pharmaceutically acceptable acid addition salt thereof in which M is hydrogen.

2. A compound of claim 1 having the formula

[Structure with R, R¹, R² and A, COOM]

wherein A is hydrogen, (lower)alkanoyloxy, azido, benzoyloxy, or a quaternary ammonium radical of the formula

[Pyridinium structure with R³, R⁴]

wherein $R^3$ and $R^4$ are each hydrogen or methyl; and

M is hydrogen, a pharmaceutically acceptable nontoxic cation or an ionic charge when A is the quaternary ammonium radical; and R, $R^1$ and $R^2$ are each (lower)alkyl, (lower)alkynyl, (lower)alkenyl or (lower)cycloalkyl.

3. The compounds of claim 2 wherein A is hydrogen, acetoxy, azido or pyridinium; and M is hydrogen, a pharmaceutically acceptable nontoxic cation or an anionic charge when A is pyridinium.

4. The compounds of claim 2 where A is hydrogen, acetoxy or azido; and M is hydrogen or a pharmaceutically acceptable nontoxic cation.

5. The compounds of claim 2 wherein A is acetoxy and M is hydrogen or a pharmaceutically acceptable nontoxic cation.

6. The compounds of claim 2 wherein A is azido and M is hydrogen or a pharmaceutically acceptable nontoxic cation.

7. The compounds of claim 2 wherein A is hydrogen, acetoxy or azido; M is hydroyen or a pharmaceutically acceptable nontoxic cation; and R, $R^1$ and $R^2$ are each (lower) alkyl, (lower) alkenyl or (lower)alkynyl.

8. The compounds of claim 2 wherein A is hydrogen, acetoxy or azido; M is hydrogen or a pharmaceutically acceptable nontoxic cation; and R, $R^1$ and $R^2$ are each (lower)alkyl.

9. The compound of claim 2 wherein A is acetoxy; M is hydrogen or a pharmaceutically aceptable nontoxic cation; and R, $R^1$ and $R^2$ are each (lower)alkyl.

10. The compound of claim 2 wherein A is azido; M is hydrogen or a pharmaceutically acceptable nontoxic cation; and R, $R^1$ and $R^2$ are each (lower)alkyl.

11. A compound of claim 1 having the formula

[Structure with H, R¹, R substituents, and A, COOM]

wherein A is hydrogen, (lower)alkanoyloxy, azido, benzoyloxy or a quaternary ammonium radical of the formula

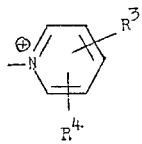

wherein

R³ and R⁴ are each hydrogen or methyl,

M is hydrogen, a pharmaceutically acceptable nontoxic cation, or an ionic charge when A is the quaternary ammonium radical; and R and R¹ are each (lower)alkyl, (lower)alknyl, (lower)alkenyl or (lower)cycloalkyl.

12. The compounds of claim 11 wherein A is hydrogen, acetoxy, azido or pyridinium; and
M is hydrogen, a pharmaceutically acceptable nontoxic cation, or an ionic charge when A is pyridinium.

13. The compounds of claim 11 wherein A is hydrogen, acetoxy or azido; and M is hydrogen or a pharmaceutically acceptable nontoxic cation.

14. The compounds of claim 11 wherein A is acetoxy and M is hydrogen or a pharmaceutically acceptable nontoxic cation.

15. The compounds of claim 11 wherein A is azido and M is hydrogen or a pharmaceutically acceptable nontoxic cation.

16. The compounds of claim 11 wherein A is hydrogen, acetoxy or azido; M is hydrogen or a pharmaceutically acceptable nontoxic cation; and R and R¹ are each (lower)alkyl, (lower)alkenyl or (lower)alkynyl.

17. The compounds of claim 11 wherein A is hydrogen, acetoxy or azido; M is hydrogen or a pharmaceutically acceptable nontoxic cation; and R and R¹ are each (lower)alkyl.

18. The compound of claim 11 wherein A is acetoxy; M is hydrogen or a pharmaceutically acceptable nontoxic cation; and R and R¹ are each (lower)alkyl.

19. The compound of claim 11 wherein A is azido; M is hydrogen or a pharmaceutically acceptable nontoxic cation; and R and R¹ are each (lower)alkyl.

20. The sodium or potassium salts of the compounds of claim 4.

21. The sodium or potassium salts of the compounds of claim 13.

22. 7-[α-(1,3-diethylamidino-2-thio) - acetamido]cephalosporanic acid or the sodium or potassium salt thereof.

23. The compound of claim 17 having the name 7-[α-(1,3-dimethylamidino - 2-thio) - acetamido]cephalosporanic acid.

24. 7-[α-(1,3-di-isopropylamidino - 2-thio)-acetamido] cephalosporanic acid or the sodium or potassium salt thereof.

25. The compound of claim 18 having the name 7-[α-(1,3-di-n-butylamidino - 2 - thio)-acetamido]cephalosporanic acid.

26. 7-[α-(1-ethyl-methylamidino - 2 - thio)-acetamido] cephalosporanic acid or the sodium or potassium salt thereof.

27. The compound of claim 18 having the name 7-[α-(1-n-butyl-3-methylamidino-2 - thio)-acetamido]cephalosporanic acid.

28. The compound of claim 18 having the name 7-[α-(1,3-di-n-propyl - amidino-2 - thio)-acetamido]cephalosporanic acid.

29. The compound of claim 9 having the name 7-[α-(1,1-diethyl-3-methylamidino - 2 - thio)-acetamido]cephalosporanic acid.

30. The compound of claim 18 having the name 7-[α-(1-methyl-3-n-propylamidino - 2 - thio)-acetamido]cephalosporanic acid.

31. 7-[α-(1-ethyl-3-n - propylamidino-2 - thio)-acetamido]cephalosporanic acid or the sodium or potassium salt thereof.

32. The compound of claim 9 having the name 7-[α-(1,1-di-n-propyl-3 - methylamidino-2-thio) - acetamido] cephalosporanic acid.

33. The compound of claim 9 having the name 7-[α-(1,1,3-triethylamidino - 2-thio) - acetamido]cephalosporanic acid.

34. The compound of claim 18 having the name 7-[α-(1-n-butyl-3 - ethylamidino-2-thio) - acetamido]cephalosporanic acid.

35. 7-[α-(1-ethyl-3 - isopropylamidino - 2-thio)-acetamido]cephalosporanic acid or the sodium or potassium salt thereof.

36. The compound of claim 14 having the name 7-[α-(1-ethyl-3-cyclopropylamidino-2-thio) - acetamido]cephalosporanic acid.

37. The compound of claim 14 having the name 7-[α-(1-allyl-3-ethylamidino - 2 - thio)-acetamido]cephalosporanic acid.

38. The compound of claim 14 having the name 7-[α-(1-propargyl-3-ethylamidino - 2 - thio)-acetamido] cephalosporanic acid.

39. The compound of claim 14 having the name 7-[α-(1-cyclopentyl-3 - ethylamidino-2-thio) - acetamido] cephalosporanic acid.

40. The compound of claim 9 having the name 7-[α-(1,1-dimethyl-3-ethylamidino - 2-thio) - acetamido]cephalosporanic acid.

41. The compound of claim 18 having the name 7-[α-(1-ethyl-3-n-pentylamidino-2-thio) - acetamido]cephalosporanic acid.

42. The compound of claim 9 having the name 7-[α-(1,1-di-isopropyl-3 - ethylamidino-2-thio) - acetamido] cephalosporanic acid.

43. The compound of claim 14 having the name 7-[α-(1-cyclohexyl-3 - ethylamidino-2 - thio) - acetamido] cephalosporanic acid.

44. 3-azidomethyl-7-(α - bromoacetamido)-3-cephem-4-carboxylic acid, or the potassium or sodium salt thereof.

45. The compound of claim 19 having the name 3-azidomethyl-7-[α-(1-ethyl - 3 - n-propylamidino-2-thio)-acetamido]-3-cephem-4-carboxylic acid.

46. The compound of claim 17 having the name 7-[α-(1-ethyl-3-n-propylamidino-2-thio) - acetamido]-3-methyl-3-cephem-4-carboxylic acid.

References Cited

UNITED STATES PATENTS

| | | | |
|---|---|---|---|
| 3,422,100 | 1/1969 | Crast | 260—243 C |
| 3,499,893 | 3/1970 | Crast | 260—243 C |
| 3,503,967 | 3/1970 | Silvestri et al. | 260—243 C |

NICHOLAS S. RIZZO, Primary Examiner

U.S. Cl. X.R.

424—246